(12) United States Patent
Hongo (10) Patent No.: US 8,264,748 B2
(45) Date of Patent: Sep. 11, 2012

(54) IMAGE READING APPARATUS AND METHOD

(75) Inventor: Masayuki Hongo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 12/502,465

(22) Filed: Jul. 14, 2009

(65) Prior Publication Data

US 2010/0033770 A1 Feb. 11, 2010

(30) Foreign Application Priority Data

Aug. 8, 2008 (JP) ................................. 2008-206394

(51) Int. Cl.
*H04N 1/04* (2006.01)
(52) U.S. Cl. ......... 358/474; 358/486; 358/497; 358/496
(58) Field of Classification Search .................. 358/474, 358/486, 497, 496, 482, 501, 505
See application file for complete search history.

(56) References Cited

U.S. PATENT DOCUMENTS

| | | | |
|---|---|---|---|
| 4,106,241 A * | 8/1978 | Fisk | 451/8 |
| 5,127,751 A * | 7/1992 | Kobayashi et al. | 400/249 |
| 6,152,626 A * | 11/2000 | Yanagi et al. | 400/279 |
| 6,547,462 B1 * | 4/2003 | Yanagi et al. | 400/283 |
| 6,559,978 B1 * | 5/2003 | Hama | 358/412 |
| 6,607,260 B1 * | 8/2003 | Ikeda | 347/19 |
| 6,633,415 B1 * | 10/2003 | Arafune et al. | 358/474 |
| 7,733,538 B2 * | 6/2010 | Kanesaka et al. | 358/474 |
| 7,924,475 B2 * | 4/2011 | Suzuki | 358/474 |
| 8,040,577 B2 * | 10/2011 | Akiyama | 358/486 |
| 8,130,423 B2 * | 3/2012 | Nakano et al. | 358/474 |
| 2004/0184118 A1 | 9/2004 | Sato | 358/497 |

FOREIGN PATENT DOCUMENTS

| | | |
|---|---|---|
| EP | 1 445 934 A1 | 8/2004 |
| JP | 8-228267 | 9/1996 |
| JP | 10-023220 | 1/1998 |
| JP | 2001-127965 | 5/2001 |
| JP | 2006-109225 | 4/2006 |
| JP | 2006-162862 | 6/2006 |
| JP | 2008-160272 | 7/2008 |

OTHER PUBLICATIONS

European Search Report issued in the corresponding European application No. 09 00 9528, dated Nov. 18, 2009.

* cited by examiner

*Primary Examiner* — Negussie Worku
(74) *Attorney, Agent, or Firm* — Fitzpatrick, Cella, Harper & Scinto (57) ABSTRACT

An image reading apparatus executes stop processing to stop scanning of the carriage during the scan operation, acquires information on the stop processing executed by the control unit, corrects a restart position of the carriage for a document image reading after the stop processing based on the information acquired.

10 Claims, 8 Drawing Sheets

IMAGE READING APPARATUS AND METHOD

BACKGROUND OF THE INVENTION

1. Field of the Invention

The present invention relates to an image reading apparatus and method for correcting a pixel reading position.

2. Description of the Related Art

Conventionally, when a data amount communicated during scanning exceeds a communicable data amount or a personal computer cannot process target data during scanning, scanning temporarily stops until data in a predetermined buffer capacity are processed. This mode will be called start-stop.

When a start-stop occurs, an optical carriage returns by a predetermined distance in a direction (to be referred to as backward) opposite to the scan direction, and then stops. The optical carriage is often moved backward because scanning needs to be done at a predetermined speed and the optical carriage requires an approach distance to reach that speed. Depending on the scan mode, the optical carriage is not moved backward. After a stop, image data communication and data processing progress, and a predetermined image data buffer becomes available. Then, the optical carriage operates in the scan direction (to be referred to as a forward direction), and starts image reading so that a scanned image is connected to one read before the start-stop occurred. That is, reading starts from an image next to the one read when the start-stop occurred.

When the optical carriage stops upon generation of a start-stop, it may slightly overrun an original stop position owing to the backlash of the motor. In this case, if the backward distance equals the forward distance to the reading start position, the optical carriage reads an image from a position advanced by the backlash. The image is reduced by the backlash, generating a streak in the image.

To prevent this, the forward distance to the reading start position is sometimes corrected with respect to the backward distance in consideration of the backlash.

Conventionally, an image reading start position after canceling a start-stop is corrected by the backlash of the motor driving system.

According to Japanese Patent Laid-Open No. 2001-127965, the time difference between the image reading start timing and the exciting timing of a stepping motor for moving the reading position is set equal between an operation before image reading temporarily stops and that when image reading restarts. This arrangement prevents an image streak upon a start-stop.

However, under the influence of a heat source near the optical carriage, optical system parts including a lens and mirror may change during the interval between the timing when a start-stop occurs to stop the optical carriage and that when the start-stop is canceled to start operating the optical carriage. The change may further change the image reading position, reducing or enlarging the image.

SUMMARY OF THE INVENTION

An aspect of the present invention is to eliminate the above-mentioned problems with the conventional technology.

The present invention provides an image reading apparatus which corrects an image reading position in accordance with the optical system parts of the carriage. Further, the present invention provides an image reading apparatus which suppresses an image streak appearing upon a change of the image reading position owing to a change of the optical system parts under the influence of a heat source near the carriage.

The present invention in its first aspect provides an image reading apparatus which performs a scan operation of a carriage including an optical system part for a document image, the apparatus comprising:
   a control unit configured to execute stop processing to stop scanning of the carriage during the scan operation;
   an acquisition unit configured to acquire information on the stop processing executed by the control unit; and
   a correction unit configured to correct a restart position of the carriage for a document image reading after the stop processing by said control unit based on the information acquired by the acquisition unit.

The present invention in its second aspect provides an image reading method executed in an image reading apparatus which performs a scan operation of a carriage including an optical system part for a document image, the method comprising:
   an acquisition step of acquiring information on stop processing to stop scanning of the carriage during the scan operation; and
   a correction step of correcting a restart position of the carriage for a document image reading after the stop processing based on the information acquired in the acquisition step.

The present invention can correct an image reading position in accordance with the optical system parts of the carriage.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

An image reading apparatus according to the present invention can perform a start-stop operation to start or stop an image reading operation in accordance with the processing load on a processing unit which processes image data read by a scan operation and the load on a communication interface with the processing unit. Further, the image reading apparatus can correct the image reading start position after canceling a start-stop, thereby reading an image without any shift. Especially when the image reading position changes upon a change of optical system parts including a lens and mirror under the influence of a heat source near an optical carriage, the image reading apparatus corrects the image reading start position after canceling a start-stop, so as to cancel the change amount.

However, the magnification of the entire image changes if the same correction value is applied to all start-stop operations executed during one scan operation. This is because the influence of the heat source near the optical carriage lessens as the optical carriage moves apart from the heat source during one scan operation. In view of this, the embodiment changes the correction amount of the image reading start position after canceling a start-stop in accordance with the degree of influence of the heat source during one scan operation.

Figure 1:
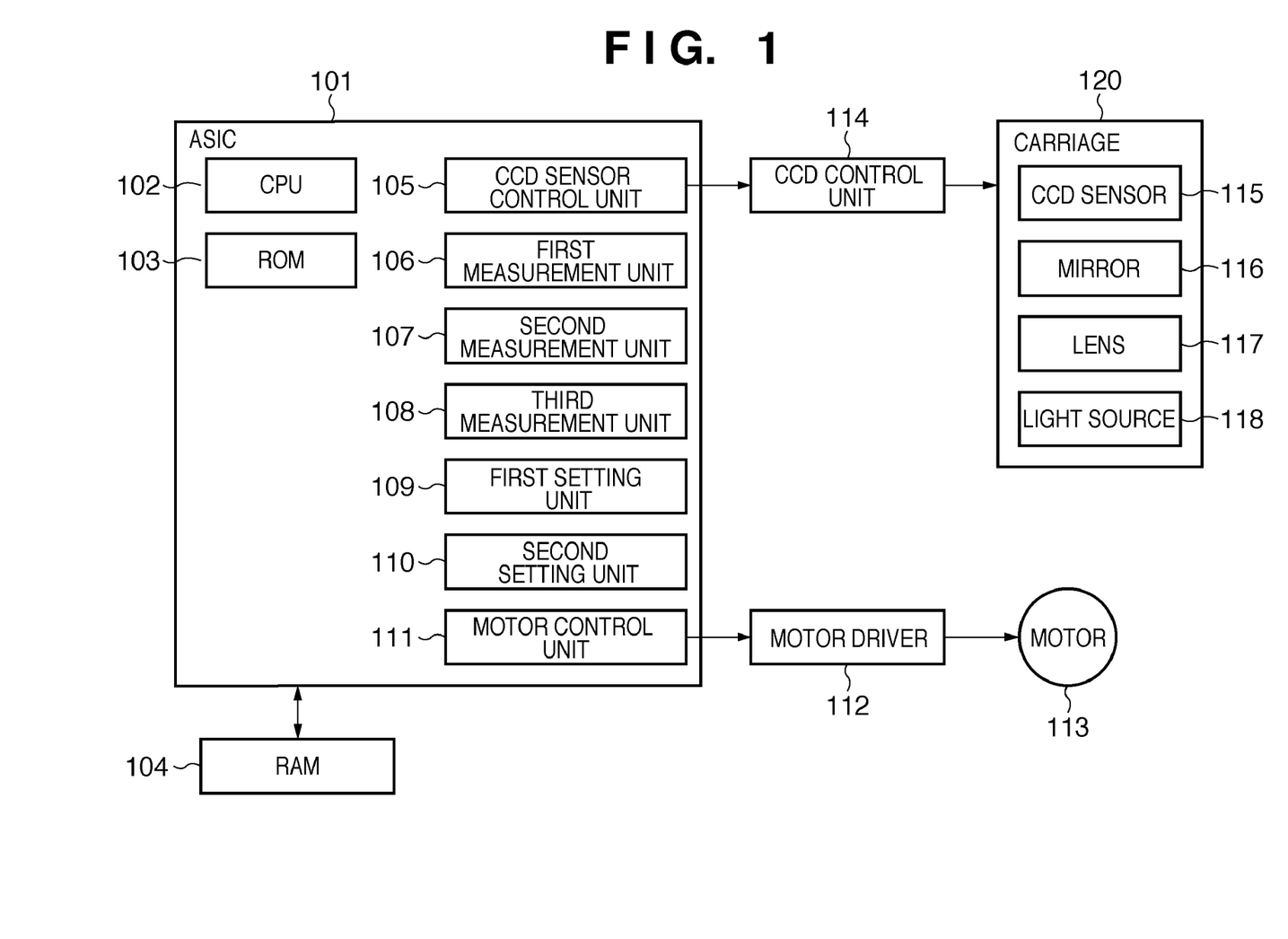
FIG. 1 is a block diagram showing the arrangement of an image reading apparatus according to an embodiment of the present invention.

FIG. 1 is a block diagram showing the arrangement of the embodiment. An ASIC 101 incorporates a CPU 102 and includes a scanner control circuit. A ROM 103 stores control programs. A RAM 104 stores read data, a motor driving table, and calibration data of a reading sensor. A CCD sensor control unit 105 performs CCD sensor control and image processing.

A first measurement unit 106 counts the number of start-stop operations of a carriage during an image reading operation. A second measurement unit 107 measures the time until a start-stop occurs after the optical carriage passes through a predetermined position. A third measurement unit 108 measures the reading stop time upon a start-stop. That is, the ASIC 101 includes an acquisition unit for acquiring information on a start-stop executed during an image reading operation. A first setting unit 109 sets the motor feed amount upon a start-stop. A second setting unit 110 sets a pixel reading position corresponding the motor phase or the number of steps. In this way, the ASIC 101 can acquire information on the number of start-stop operations and information on the start-stop processing time. Further, the ASIC 101 can set motor driving information upon a start-stop and a pixel reading position (reading range).

A motor control unit 111 controls an optical carriage driving motor 113. A motor driver 112 drives the optical carriage driving motor 113. A CCD control unit 114 is a control unit for a timing generator for driving a CCD sensor and an analog front end for converting a sensor output into a digital value. The control unit may also be mounted on the substrate of the optical carriage. An optical carriage 120 includes optical system parts including at least a CCD sensor 115, at least one mirror 116, a lens 117, and a light source 118.

The optical carriage and optical path will be explained with reference to FIG. 2. The optical carriage includes a substrate 210 supporting a CCD sensor 209, a light source 203 for irradiating a document 202 on the surface of a document glass 201, a first mirror 204, a second mirror 205, a third mirror 206, a fourth mirror 207, and a lens 208.

For example, when the lens 208 tilts under the influence of the heat source, the optical path changes to the one indicated by a dotted line, shifting the reading position on the document surface. Similarly, a change of the mirror angle under the influence of the heat source shifts the reading position on the document surface. As the optical carriage moves apart from the heat source during one scan operation, the influence of the heat source near the optical carriage weakens. Accordingly, the reading position on the document surface shifts less.

Figure 2:
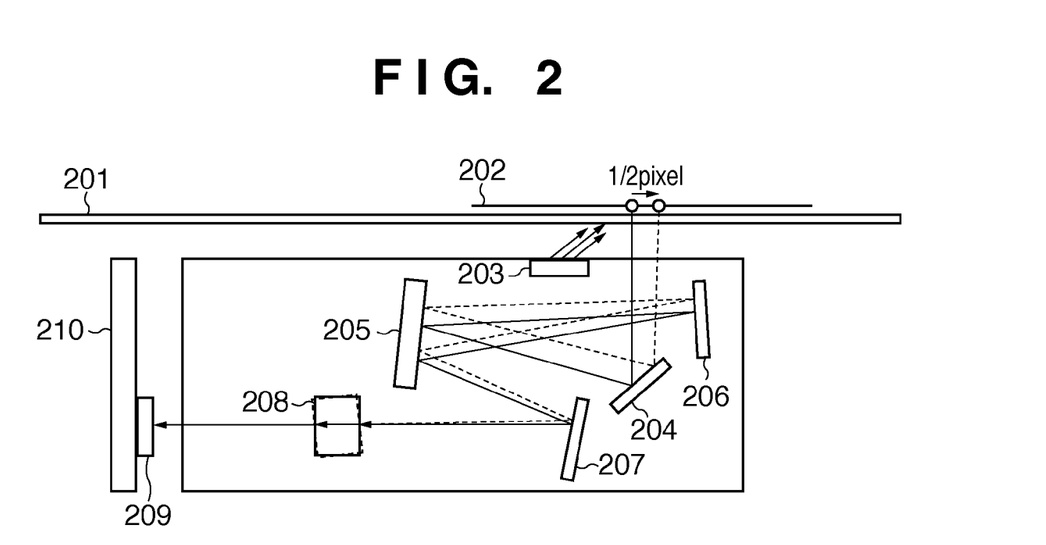
FIG. 2 is a sectional view showing the arrangement of an optical system.

A CCD system using the CCD sensor shown in FIG. 2 will be exemplified. However, the present invention may also employ a CIS (Contact Image Sensor) optical system using a CIS sensor.

Figure 3:
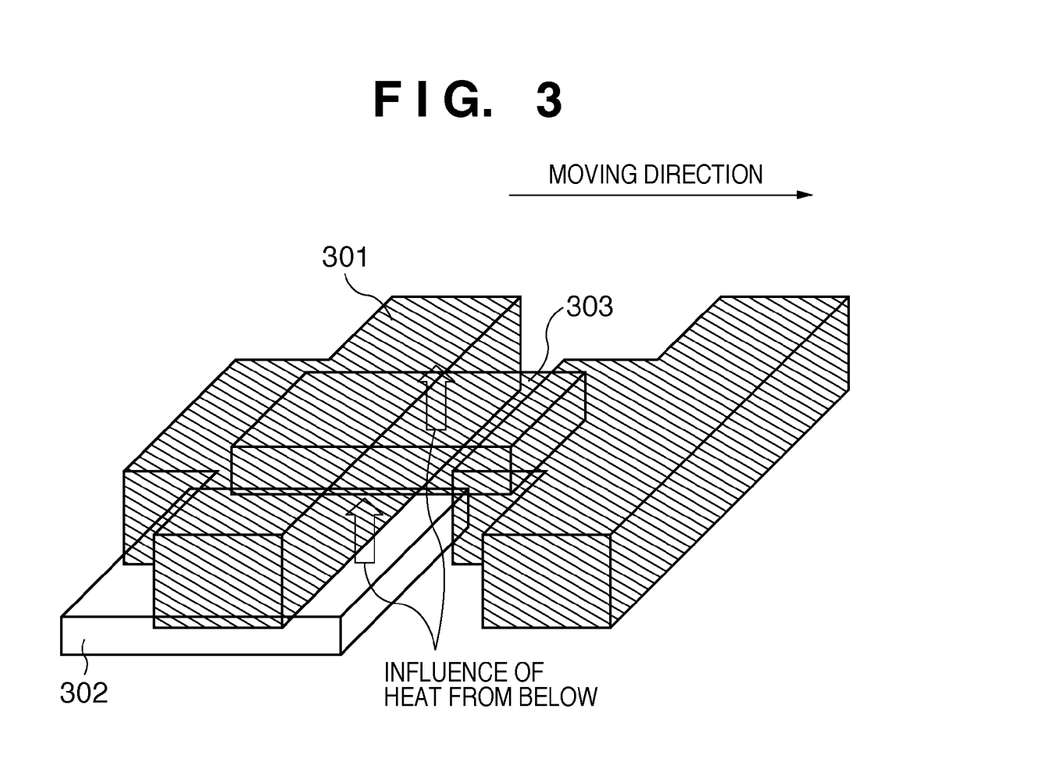
FIG. 3 is a perspective view for explaining the influence of a heat source.

The influence of the heat source on the optical carriage will be explained with reference to FIG. 3. A document is set above an optical carriage 301 (in a direction opposite to a control board 302). In the arrangement of the embodiment, the control board 302 and a power supply 303 are arranged below the optical carriage 301. The control board 302 includes the ASIC 101, RAM 104, motor driver 112, and DC-DC converter, and controls the scanner. The power supply 303 is a packed power supply incorporated in the scanner. The place where the control board 302 and power supply 303 are arranged is the standby position of the optical carriage 301. The standby position is a place where the optical carriage 301 returns and stops after scanning.

In this arrangement, after the optical carriage returns to the standby position, its bottom surface is warmed up by heat of the control board 302 and power supply 303. When scanning starts, the warmed optical carriage moves apart from the underlying heat source in a moving direction (main scanning direction) indicated by an arrow. Since the optical carriage moves in a direction in which the influence of the heat source lessens, the increased temperature of the bottom surface of the carriage falls.

Figure 4:
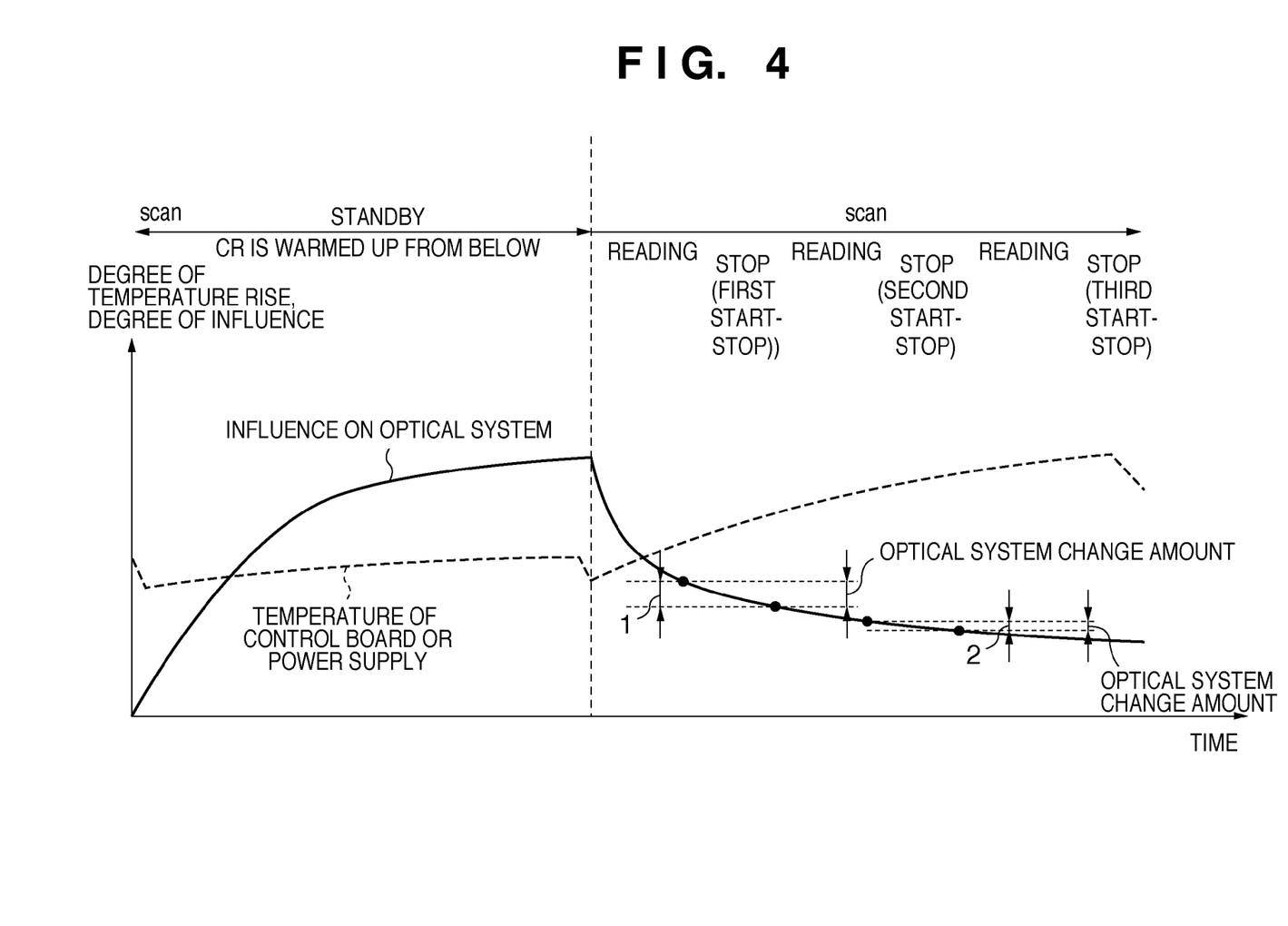
FIG. 4 is a view showing a graph for explaining the influence of the heat source.

The influence of the heat source on the optical system upon generation of a start-stop will be described with reference to FIG. 4. FIG. 4 is a graph showing a comparison between the degree of temperature rise of the control board 302 and power supply 303 and the degree of influence of the temperature rise on the optical system of the optical carriage 301 when the carriage starts scanning from the standby state and a plurality of start-stop operations occur. A dotted line indicates the degree of temperature rise, and a solid line indicates the degree of influence. In FIG. 4, the abscissa axis represents time, and the ordinate axis represents the degree of temperature rise or influence. The degree of influence in FIG. 4 means, for example, the shift amount of the reading position on the document surface upon a change of the optical path, which has been explained with reference to FIG. 2.

While the optical carriage 301 stays at the standby position, no reading operation is done and the temperature of heat generated by the control board and power supply is relatively low. However, the clearance between the control board and power supply and the optical carriage is inevitably small to minimize the thickness of the scanner main body. Thus, the optical carriage is readily affected by heat of the control board 302 and power supply 303. As represented in the standby period in FIG. 4, the influence on the optical system of the optical carriage 301 during standby is significant.

When scanning starts in a predetermined resolution mode, the optical carriage 301 moves in the main scanning direction to read an image. After the start of reading, the optical carriage moves apart from the control board 302 and power supply 303, and the increased temperature of the bottom surface of the carriage falls, as described with reference to FIG. 3. At this time, if a start-stop occurs, the carriage stops. During scanning, the scan operation raises the temperatures of the control board 302 and power supply 303. As the optical carriage 301 moves apart from the heat source, the influence on the optical system of the optical carriage 301 weakens.

The decrease in the rising temperature of the bottom surface of the optical carriage means that the optical system shifted upon warming returns to the original position. More specifically, as the optical carriage 301 moves apart from the heat source in the scan operation, the shifted optical system returns to the original position. When a start-stop occurs, the carriage stops and the optical system shifts again under the influence of the heat source. The optical carriage 301 repeats this operation on one line.

As shown in FIG. 4, after the start of scanning, the shift of the optical system by heat reduces as scanning proceeds (i.e., the optical carriage moves apart from the heat source in the main scanning direction).

As shown in FIG. 4, optical system change amount 2 before and after the second start-stop is smaller than optical system change amount 1 before and after the first start-stop. In this manner, as the start-stop operation count increases to three, four, and more, the optical system change amount (shift) decreases. That is, the shift amount differs between respective start-stop operations in a 1-line scan operation.

Figure 5:
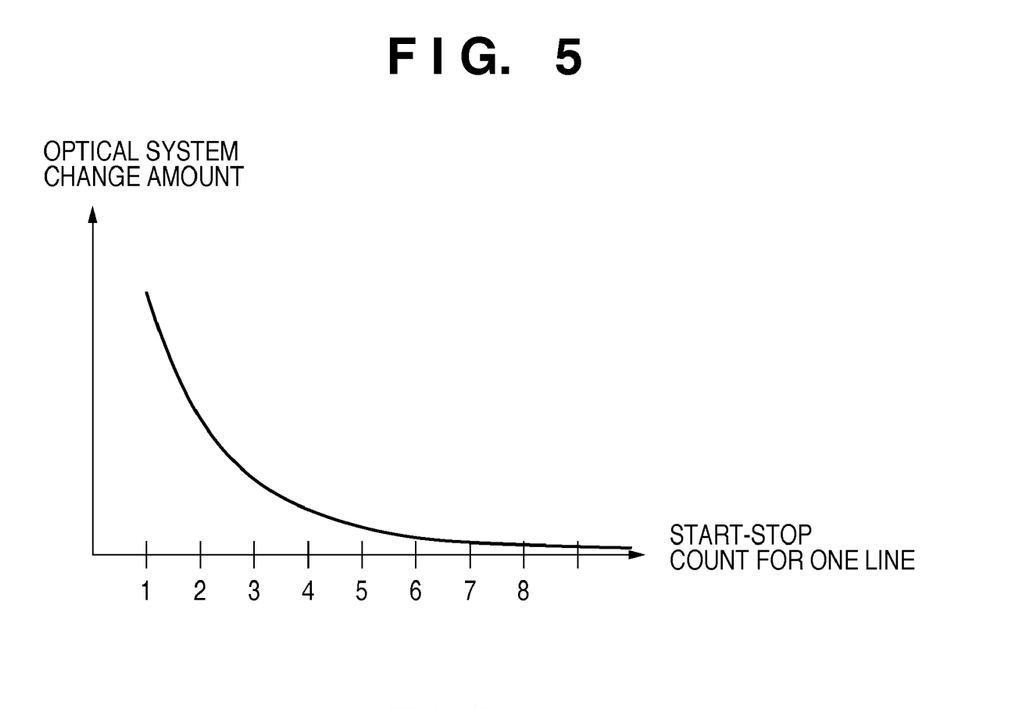
FIG. 5 is a view showing a graph showing the relationship between the start-stop generation count on one line and the optical system change amount (shift amount) of a carriage.

The change of the optical system change amount in FIG. 4 will be explained in more detail with reference to FIG. 5. FIG. 5 is a graph showing the relationship between the start-stop generation count on one line and the optical system change amount (shift amount) of the carriage. In FIG. 5, the abscissa axis represents generation of the first start-stop to eighth start-stop. As shown in FIG. 4, the larger the start-stop generation count on one line is, the smaller the optical system change amount (shift) of the optical carriage 301 is. The start-stop generation count depends on, for example, the scan resolution. A higher resolution requires a larger data amount processed per unit time, so start-stops occur more readily.

The start-stop generation count also depends on the communication speed of an interface for connecting a personal computer (PC). For example, when the PC is connected by a USB interface, the data amount communicable per unit time by USB1.1 is smaller than that by USB2.0, and start-stops occur more frequently.

The start-stop generation count further depends on the performance of the personal computer. In a personal computer of poor performance, the buffer used to process scanned data becomes full soon. When scanned data are transferred to such a personal computer, processing of them often suspends and start-stops occur frequently.

Figure 6:
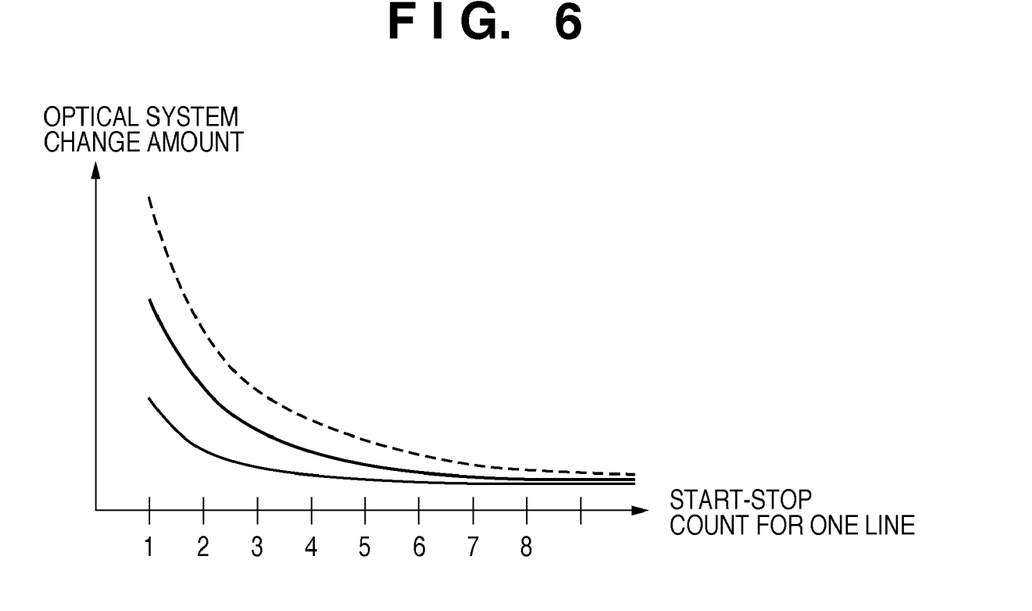
FIG. 6 is a view showing a graph showing the optical system change amount when changing the stop time of an optical carriage 301 upon generation of a start-stop.

The relationship between the stop time of the optical carriage and the optical system change amount (shift amount) upon generation of a start-stop will be explained with reference to FIG. 6. FIG. 6 is a graph showing the optical system change amount when changing, based on FIG. 5, the stop time of the optical carriage 301 upon generation of a start-stop. A dotted line represents a change when prolonging the stop time upon generation of a start-stop based on a thick solid line. A longer stop time of the optical carriage 301 increases the shift of the optical system that changes during the stop. To the contrary, a thin solid line represents that a shorter stop time of the optical carriage 301 decreases the optical system change amount, compared to the thick solid line. Similar to the above-mentioned start-stop generation count, the stop time upon generation of a start-stop changes depending on the scan resolution, the communication speed of an interface with a PC, and the performance of the PC.

Figure 7:
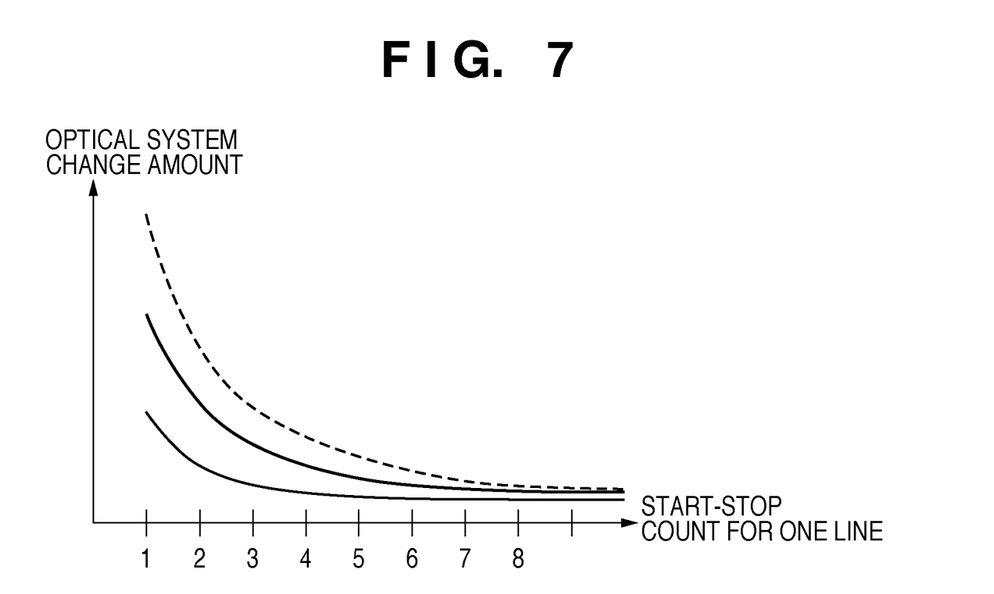
FIG. 7 is a view showing a graph showing the optical system change amount of the optical carriage 301 when changing the time until a start-stop occurs after the start of scanning.

The relationship between the time until a start-stop occurs after the start of scanning and the optical system change amount (shift amount) will be explained with reference to FIG. 7. FIG. 7 is a graph showing the optical system change amount of the optical carriage 301 when changing, based on FIG. 5, the time until the first start-stop occurs after the start of scanning. A dotted line represents a change when shortening, based on a thick solid line, the time until a start-stop occurs after the start of scanning. As shown in FIG. 7, the dotted line exhibits a larger optical system change amount than that by the thick solid line. In contrast, a thin solid line represents that a longer time until a start-stop occurs after the start of scanning leads to a smaller optical system change amount, compared to the thick solid line. That is, the shorter the time until a start-stop occurs after the start of scanning is, the larger the optical system change amount is. This is because the first start-stop occurs at a portion close to the heat source. The time until a start-stop occurs after the start of scanning greatly depends on the resolution, but also depends on the communication speed of an interface with a PC and the performance of the PC.

As described with reference to FIGS. 5 to 7, the optical system change amount of the optical carriage 301 changes depending on the start-stop generation position, the stop time upon generation of a start-stop, and the time until a start-stop occurs after the start of scanning.

Referring back to FIG. 2, the solid line represents an optical path before generation of a start-stop. If a start-stop occurs, the optical path changes to one represented by the dotted line. As is apparent from FIG. 2, the lens angle changes under the influence of heat, and the center of the optical axis shifts in a direction in which the image reduces by, for example, a ½ pixel.

Figure 8:
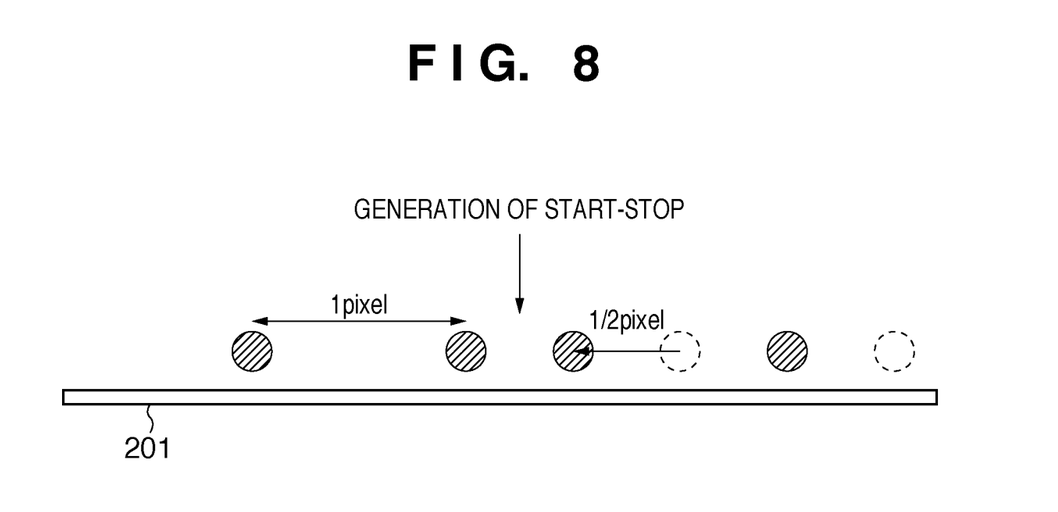
FIG. 8 is a view for explaining correction of a pixel reading position.

To correct the shift amount, the position to read the next pixel after canceling a start-stop is returned by a ½ pixel, as shown in FIG. 8. This enables reading successive images before and after a start-stop occurs.

As described above with reference to FIG. 4, as the optical carriage moves apart from the heat source near it, the influence of the heat source weakens, decreasing the shift of the reading position on the document surface. For this reason, the embodiment dynamically changes the correction amount every time a start-stop is canceled in 1-line scanning.

Figure 9:
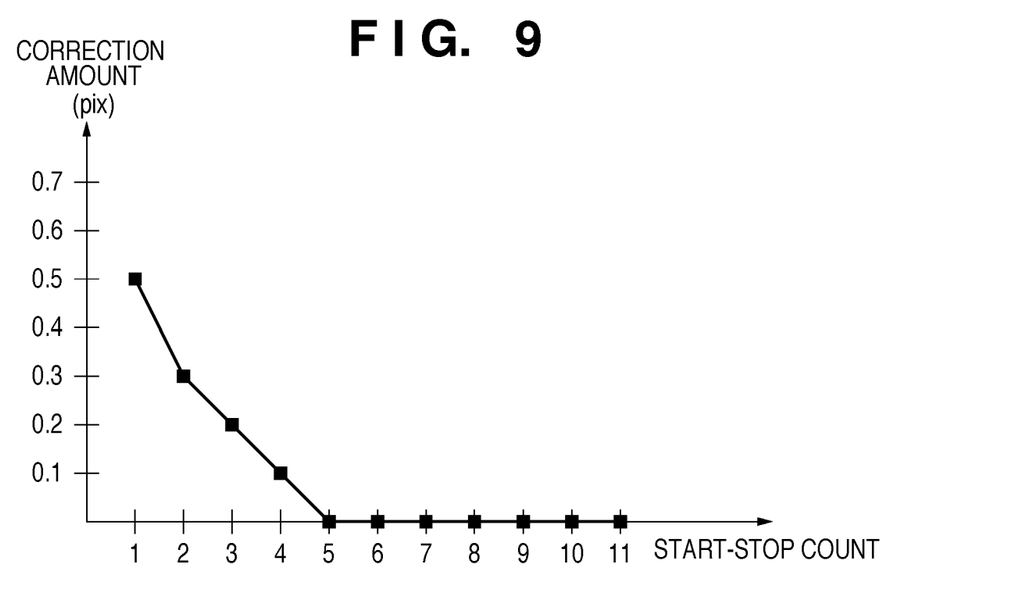
FIG. 9 is a view showing a graph exemplifying a correction amount for each start-stop in the embodiment.

FIG. 9 is a graph exemplifying a correction amount for each start-stop in the embodiment. As shown in FIG. 9, the correction amount for the first start-stop is 0.5 pixels, that for the second one is 0.3 pixels, and that for the third one is 0.2 pixels. A shift of the optical axis is corrected by a correction amount corresponding to an optical system change amount. In FIG. 9, no correction is done for the fifth start-stop and subsequent ones. In the embodiment, the image reading apparatus can change the correction amount in accordance with the start-stop generation count to correct the pixel reading position (change of the correction amount). It is also possible to acquire start-stop position information based on the reading start position or standby position, and set a correction amount based on the information.

As shown in FIGS. 5 to 7, the optical system change amount depends on the start-stop generation position, the stop time upon generation of a start-stop, and the time until a start-stop occurs after the start of scanning. The correction amount is decided in consideration of these factors. More specifically, information on generation of a start-stop is acquired, and the reading position is corrected based on the information.

Figure 10:
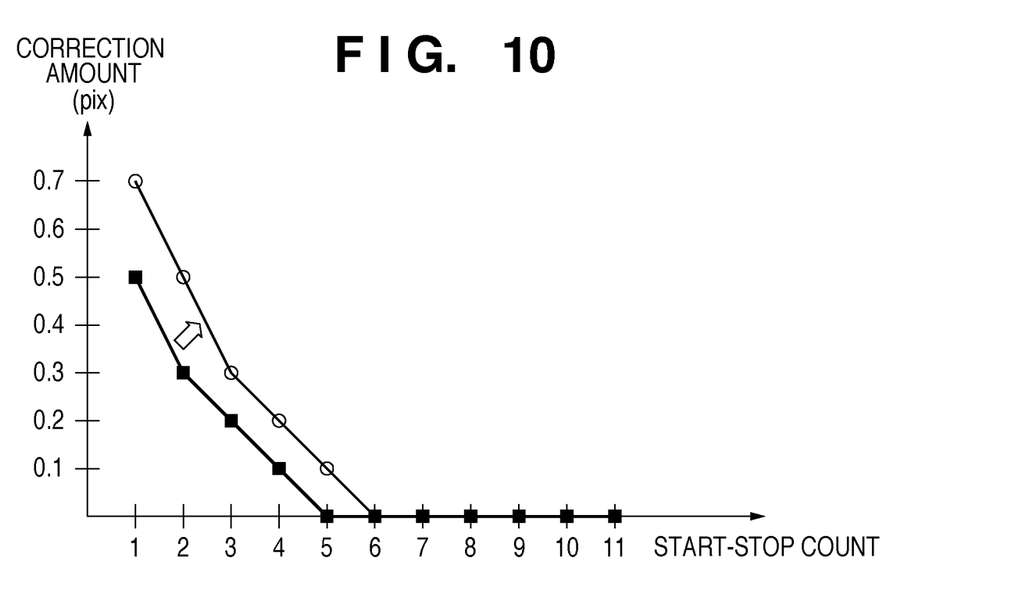
FIG. 10 is a view showing a graph exemplifying a change of the correction amount when shortening the time until a start-stop occurs after the start of scanning.

FIG. 10 is a graph exemplifying a change of the correction amount when shortening the time until a start-stop occurs after the start of scanning. As described with reference to FIG. 7, a shorter time until a start-stop occurs after the start of scanning increases the optical system change amount. The correction amount needs to be increased, too, as shown in FIG. 10.

A longer stop time upon generation of a start-stop increases the optical system change amount, so the correction amount needs to be increased, too. In the embodiment, a change of the correction amount corresponding to the stop time upon generation of a start-stop may be stored as a correction amount in advance. A change of the correction amount considering the time until a start-stop occurs after the start of scanning and the stop time upon generation of a start-stop may also be stored as a correction amount in advance.

As described above, the pixel reading position after canceling a start-stop is corrected in accordance with measurement values such as the start-stop generation count, the time until a start-stop occurs after the start of scanning, and the stop time upon generation of a start-stop. As a result, the image reading apparatus can obtain successive images.

By dynamically changing the correction amount during 1-line scanning, the image reading apparatus can read successive images before and after generation of a start-stop without affecting the magnification of the read image.

In particular, high-resolution scanning sometimes causes start-stops 100 or more times. In this case, if the correction amount is fixed during scanning, correction is excessively done, changing the magnification of the image read by one scanning. To prevent this, it is very effective to dynamically change the correction amount, like the embodiment.

Figure 11:
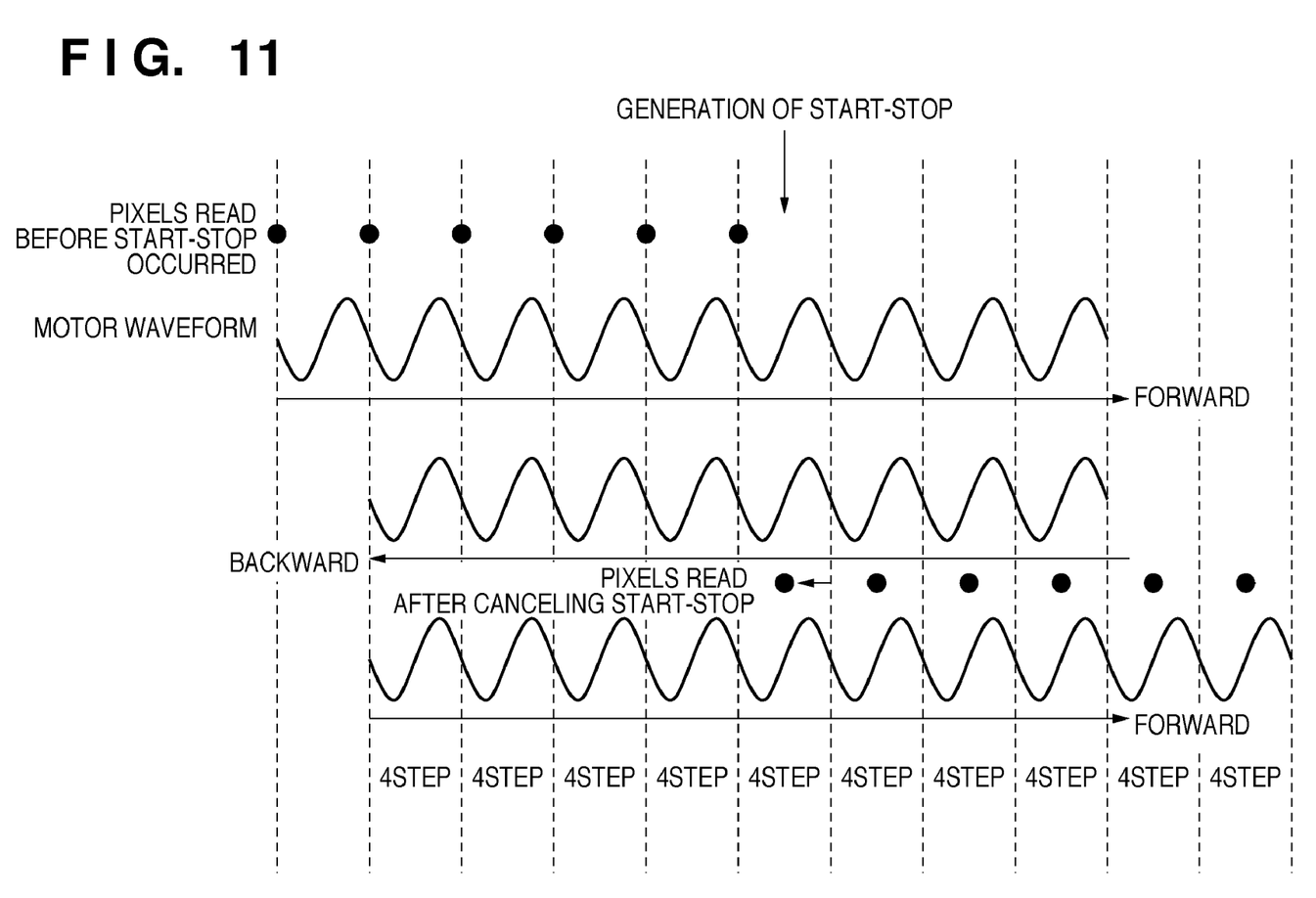
FIG. 11 is a view for explaining an image reading position correction method.

A method of correcting the shift of the image reading position after canceling a start-stop will be described with reference to FIGS. 11 and 12.

The method in FIG. 11 will be explained first. When a start-stop occurs, the motor 113 using a stepping motor stops at a position corresponding to four turns (=16 steps) of the motor 113. The motor 113 is rotated backward by 32 steps and then stops until the start-stop is canceled. When the buffer becomes available to cancel the start-stop, the motor 113 is rotated forward again. In the case of FIG. 11, the phase of the motor 113 is associated with the pixel reading position. A predetermined motor phase is used as a reference to set the correction amount of the image reading position after canceling the start-stop in accordance with the motor phase (rotational phase) associated with the pixel reading position before generation of the start-stop. In FIG. 11, the image reading position is corrected by a ½ pixel after canceling the start-stop.

It is also possible to set the correction amount of the image reading position after canceling a start-stop in accordance with the number of steps associated with the image reading position before generation of the start-stop.

Figure 12:
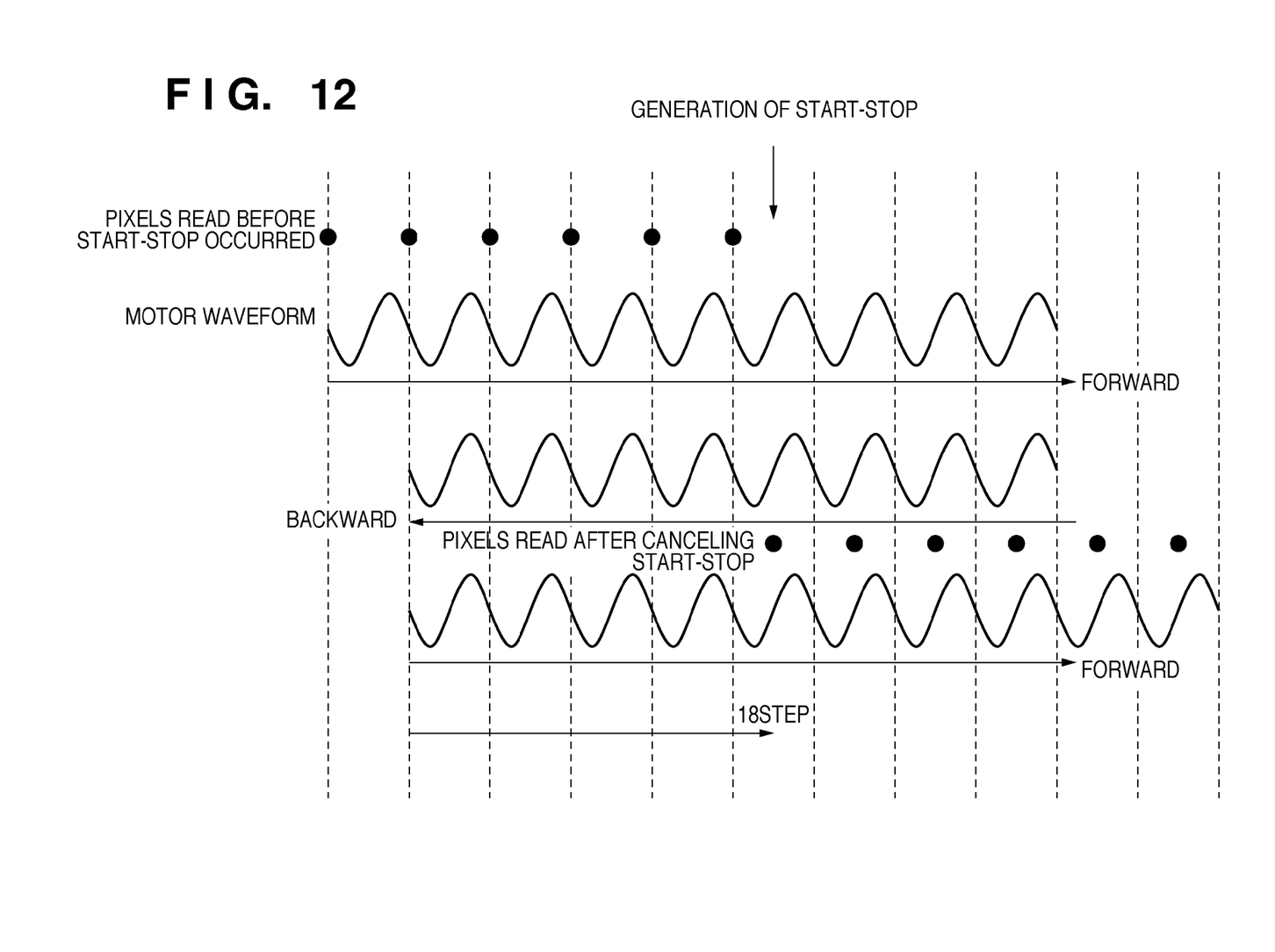
FIG. 12 is a view for explaining the image reading position correction method.

FIG. 12 is a chart for explaining an image reading position correction method when the pixel reading position can be set in synchronism with driving timing of the motor (the number of steps of the motor). When a start-stop occurs, the motor 113 stops at a position corresponding to four turns (=16 steps) of the motor. The motor 113 is rotated backward by 32 steps and then stops until the start-stop is canceled. When the buffer becomes available to cancel the start-stop, the motor 113 is rotated forward again. At this time, pixel reading should originally start from the 20th step. However, to correct the optical system shift amount, pixel reading starts from the 18th step (i.e., the image reading position is corrected by a ½ pixel), as shown in FIG. 12. The pixel reading position may be corrected more finely by controlling the motor not by the step but by a finer motor phase.

As described above, the image reading position on a document changes upon a change of the position or angle of an optical system part in the optical carriage under the influence of the heat source such as the power supply near the optical carriage. The optical carriage is warmed up by heat of the heat source during standby. As the optical carriage moves apart from the heat source in the scan operation, the warmed optical carriage cools.

If a start-stop occurs to stop the optical carriage, the optical system shifts again under the influence of the heat source. According to the embodiment, the image reading apparatus corrects the pixel reading position upon canceling the start-stop, achieving high-quality scanning free from an image streak.

A correction amount kept constant during 1-line scanning affects the magnification of an image if start-stops occur frequently. However, according to the embodiment, the image reading apparatus changes the correction amount every time a start-stop is canceled, and can correct the image reading position without affecting the magnification.

OTHER EMBODIMENTS

The contents of the embodiment will be complemented. The influence of heat generated by the control board or power supply may be negligible upon activating the image reading apparatus. The temperature of an environment where the image reading apparatus is installed may be low. For this reason, the correction value of the optical system change amount is changed based on the time elapsed after activating the image reading apparatus. The correction value of the optical system change amount is also changed based on the environmental temperature. The correction value of the optical system change amount may also be changed based on the environmental temperature and the time elapsed after activating the image reading apparatus.

In the embodiment, the optical carriage moves apart from the heat source during a reading operation. The present invention is applicable to even a case in which the optical carriage comes close to the heat source during a reading operation. In this case, the correction amount is increased based on information such as the start-stop count or start-stop position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-206394, filed Aug. 8, 2008, which is hereby incorporated by reference herein in its entirety.

What is claimed is:

1. An image reading apparatus which performs a scan operation of a carriage which includes an optical system part for a document image, the apparatus comprising:
a control unit configured to control the carriage to stop and to restart during one scan operation;
an acquisition unit configured to acquire information on the stop and the restart of the carriage during the one scan operation; and
a correction unit configured to correct a position for the restart of the carriage after the stop of the carriage during the one scan operation, wherein the position is corrected based at least in part on the acquired information.

2. The apparatus according to claim 1, wherein the acquisition unit acquires at least one of a time until first stop processing occurs after a start of the one scan operation, a stop processing count after the start of the one scan operation, and a stop time of the carriage.

3. The apparatus according to claim 1, further comprising a processing unit configured to process image data obtained by the scan operation, wherein
the control unit controls the carriage to stop based on a processing load on the processing unit.

4. The apparatus according to claim 1, wherein the control unit is arranged near a standby position of the carriage from which the one scan operation is started.

5. The apparatus according to claim 1, wherein the optical system part includes at least one of a mirror and a lens, a sensor, and a light source.

6. The apparatus according to claim 5, wherein the sensor includes a CCD sensor.

7. The apparatus according to claim 5, wherein the sensor includes a CIS sensor.

8. The apparatus according to claim 1, further comprising a heat source arranged beside a standby position of the carriage from which the one scan operation is started.

9. The apparatus according to claim 1, further comprising a power supply arranged beside a standby position of the carriage from which the one scan operation is started.

10. An image reading method executed in an image reading apparatus which performs a scan operation of a carriage which includes an optical system part for a document image, the method comprising:
controlling the carriage to stop and to restart during one scan operation;
acquiring information on the stop and the restart of the carriage during the one scan operation; and
correcting a position for the restart of the carriage after the stop of the carriage during the one scan operation, wherein the position is corrected based at least in part on the acquired information.

* * * * *